(12) United States Patent
Laurent et al.

(10) Patent No.: US 8,771,896 B2
(45) Date of Patent: Jul. 8, 2014

(54) FUEL CELL WITH CURRENT COLLECTORS INTEGRATED WITH THE SOLID ELECTROLYTE AND PROCESS FOR MANUFACTURING SUCH A FUEL CELL

(75) Inventors: Jean-Yves Laurent, Domene (FR); Philippe Capron, Luzinay (FR); Audrey Martinent, Grenoble (FR); Denis Locatelli, Moirans (FR)

(73) Assignee: Commissariat a l'Energie Atomique, Paris (FR)

( * ) Notice: Subject to any disclaimer, the term of this patent is extended or adjusted under 35 U.S.C. 154(b) by 1261 days.

(21) Appl. No.: 12/085,035

(22) PCT Filed: Dec. 4, 2006

(86) PCT No.: PCT/FR2006/002640
§ 371 (c)(1),
(2), (4) Date: May 15, 2008

(87) PCT Pub. No.: WO2007/068810
PCT Pub. Date: Jun. 21, 2007

(65) Prior Publication Data
US 2009/0169945 A1 Jul. 2, 2009

(30) Foreign Application Priority Data

Dec. 9, 2005 (FR) ...................... 05 12528

(51) Int. Cl.
*H01M 8/10* (2006.01)
*H01M 8/00* (2006.01)
(52) U.S. Cl.
USPC .......... 429/479; 429/491; 429/492; 29/623.1; 29/623.5

(58) Field of Classification Search
None
See application file for complete search history.

(56) References Cited

U.S. PATENT DOCUMENTS

| 6,180,275 B1 * | 1/2001 | Braun et al. .................. 429/519 |
| 6,242,123 B1 * | 6/2001 | Nezu et al. .................... 429/474 |
| 2005/0019635 A1 * | 1/2005 | Arroyo et al. .................... 429/32 |
| 2005/0250004 A1 * | 11/2005 | McLean et al. ............... 429/122 |
| 2006/0134500 A1 | 6/2006 | Marsacq et al. |

FOREIGN PATENT DOCUMENTS

| EP | 1 291 944 A1 | 3/2003 | |
| EP | 1 429 408 A1 | 6/2004 | |
| EP | 1 434 297 A2 | 6/2004 | |
| EP | 1429408 A1 * | 6/2004 | ............. H01M 8/10 |
| EP | 1 562 243 A1 | 8/2005 | |
| FR | 2 857 162 A1 | 1/2005 | |
| WO | WO 2005/015669 A2 | 2/2005 | |

* cited by examiner

*Primary Examiner* — Kwang Han
(74) *Attorney, Agent, or Firm* — Oliff PLC

(57) ABSTRACT

A fuel cell comprises at least two current collectors, an electrically insulating separator element and solid electrolyte. Each current collector comprises at least one transverse passage passing through it from a first surface to a second surface and the separator element comprising opposite first and second faces is arranged between the current collectors. A plurality of transverse channels pass through the separator element from the first face to the second face and the ionically conducting solid electrolyte occupies the volume bounded by the channels of the separator element and by the passages of the current collectors. The separator element is formed by a thermoplastic polymer material and hard particles are arranged in the transverse channels.

15 Claims, 3 Drawing Sheets

FUEL CELL WITH CURRENT COLLECTORS INTEGRATED WITH THE SOLID ELECTROLYTE AND PROCESS FOR MANUFACTURING SUCH A FUEL CELL

BACKGROUND OF THE INVENTION

The invention relates to a fuel cell and more particularly to a fuel microcell comprising at least:
- two respectively anodic and cathodic current collectors, each comprising at least one transverse passage passing through said corresponding current collector from a first surface to a second surface,
- an electrically insulating separator element arranged between the anodic and cathodic current collectors and comprising opposite first and second faces respectively in contact with the first surfaces of the anodic and cathodic current collectors, and a plurality of transverse channels passing through the separator element from the first face to the second face,
- an ionically conducting solid electrolyte in contact with the two current collectors and occupying the volume bounded by the channels of the separator element and by the passages of the current collectors.

The invention also relates to a process for manufacturing such a fuel cell.

STATE OF THE ART

To reduce the size of ionically-conducting solid-electrolyte fuel cells while at the same time preserving the efficiency of the current collectors, it has been proposed to form the current collectors directly on the faces of an electrolytic membrane.

The document EP-A-1562243 proposes for example a method enabling the current collectors to be transferred onto an electrolytic membrane. A current collector is thereby produced by deposition of galvanic metal in a mold provided with pass-through openings so that the deposition of galvanic metal overflows from the openings as a bead. It is then transferred onto an electrolytic membrane stuck to a support plate. Transfer is then performed by pressing the assembly containing the collector and the assembly containing the membrane against one another. The pressure exerted enables at least a part of the bead of the collector to be incrusted in the membrane. The two assemblies are then moved apart so that the current collector is detached from its assembly and remains fixed to the membrane. The support plate is then separated from the membrane. In an alternative embodiment, transfer can also be performed by applying a deferred-setting glue to the bead of the collector before assembling the two assemblies respectively containing the collector and the membrane and making the glue set before moving the two assemblies apart.

Such a manufacturing method proves to be complex and not very practical to implement. It requires the membrane and current collectors to be produced separately before being assembled to one another and the two current collectors are successively transferred onto the membrane. Moreover, with a membrane of small thickness, a short-circuit may occur when the electrodes are fitted on the assembly comprising the current collectors and said membrane.

To reduce the size of fuel cells, US Patent application 2005/0250004 proposes an ion-exchanging membrane comprising a non-conducting element formed by a substrate, in addition to the ionically conducting material. The substrate is provided with one or more openings passing through it and the ionically conducting material fills said openings. Two current collectors can be respectively arranged on the two opposite faces of the substrate. The current collectors each comprise a transverse passage which can also be filled with ionically conducting material. Such a substrate gives the ion-exchanging membrane a certain mechanical strength, which enables its thickness to be reduced compared with usual membranes. It is for example formed by a printed circuit, by a polymer film such as a polyamide, polyimide, polyethylene or Teflon® film, and by a composite material reinforced for example by glass fibres. In other applications, the substrate can be made of flexible material.

The use of such a substrate is not however always satisfactory to make certain fuel cells dependable, in particular in the case of cells produced by previously manufacturing the current collectors, for example in the form of a grid or comb, and by assembling the current collectors on said solid electrolytic membrane.

OBJECT OF THE INVENTION

The object of the invention is to provide a fuel cell and its manufacturing process remedying the shortcomings of the prior art.

According to the invention, this object is achieved by the appended claims. More particularly, this object is achieved by the fact that the separator element is formed by a thermoplastic polymer material and that spacers formed by electrically insulating hard particles are arranged in transverse channels of said separator element.

This object is also achieved by the fact that the process for manufacturing such a fuel cell successively comprises the following steps:
- insertion of spacers formed by electrically insulating hard particles in the transverse channels of the separator element,
- assembly of the anodic and cathodic current collectors, with their first surfaces respectively on the first and second faces of the separator element,
- and filling of the channels and passages by the solid electrolyte.

BRIEF DESCRIPTION OF THE DRAWINGS

Other advantages and features will become more clearly apparent from the following description of particular embodiments of the invention given as non-restrictive examples only and represented in the accompanying drawings, in which.

DESCRIPTION OF PARTICULAR EMBODIMENTS

A fuel cell and more particularly a fuel microcell according to the invention comprises at least two current collectors, respectively anodic and cathodic, integrated in a solid electrolyte. Integration of the current collectors in the solid electrolyte is facilitated by the presence of an electrically insulated separator element and by spacers.

The current collectors each comprise first surface and second surface preferably opposite. Each current collector also comprises at least one transverse passage and preferably a plurality of transverse passages passing through said current collector from the first surface to the second surface. Thus, at least one of the current collectors can be in the form of a grid, a comb, or a thin layer of woven material or of porous material. The two current collectors often have the same shape. They can be made of metal, for example from gold or nickel, graphite or an electrically conducting polymer material.

Figure 1:
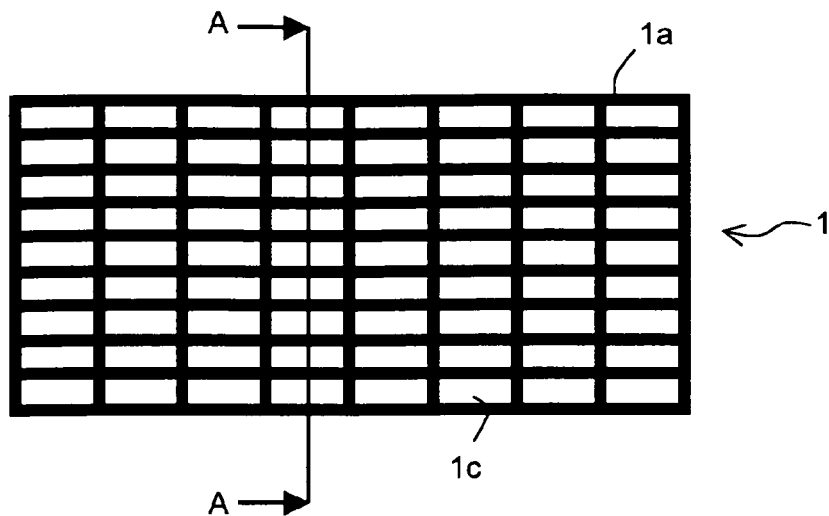
FIGS. 1 and 2 respectively represent a current collector in the form of a grid in top view and in enlarged cross-section along A-A.
Figure 2:
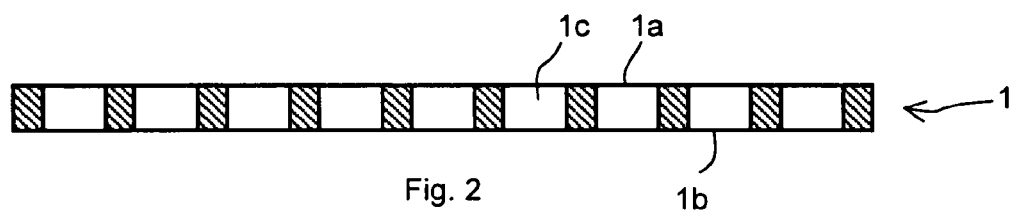
Figure 3:
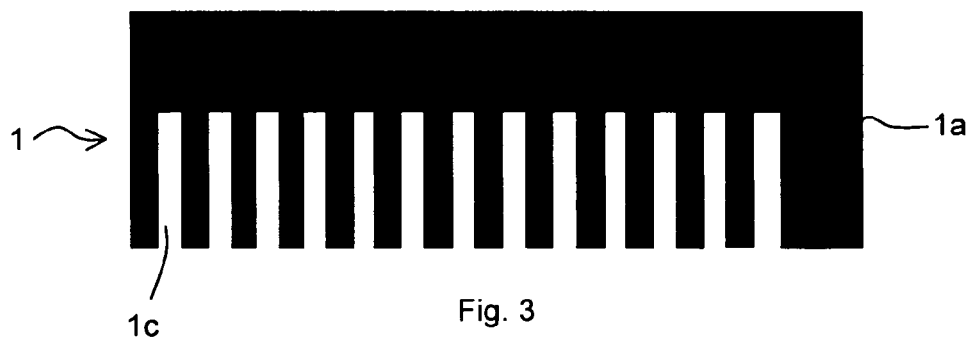
FIG. 3 illustrates a current collector in the form of a comb in top view.

For example purposes, FIGS. 1 and 2 represent a current collector 1 in the form of a grid and, in FIG. 3, the current collector is in the form of a comb. Current collector 1, in the form of a grid or comb, therefore comprises opposite first and second surfaces 1a and 1b and transverse passages 1c passing through it from first surface 1a to the second surface 1b. In FIG. 1, current collector 1 comprises for example 72 transverse passages.

The separator element comprises opposite first and second faces respectively designed to come into contact with the first surfaces of the anodic and cathodic current collectors. It comprises a plurality of transverse channels passing through it from the first face to the second face. The separator element can for example be in the form of a perforated film, a grid, or a thin layer of woven material or of porous material. In addition, the separator element is formed by a thermoplastic polymer material and preferably by a fluorocarbon resin. Among the fluorocarbon resins, resins chosen from a modified ethylene and tetrafluoroethylene (ETFE) copolymer, polyvinylidene fluoride (PVDF), a polyvinylidene fluoride and propylene hexafluoride copolymer (PVDF) can be cited.

Figure 4:
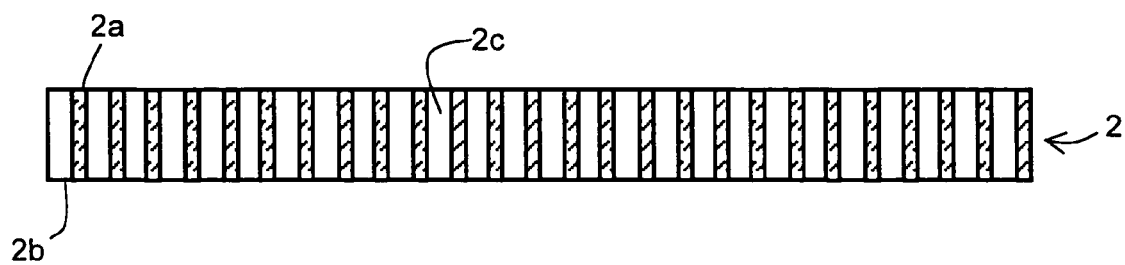
FIG. 4 represents a separator element in the form of a grid in cross-section.

For example purposes, FIG. 4 represents in cross-section a separator element 2 able to be used in a fuel cell according to the invention. It is in the form of a grid, with opposite first and second faces 2a and 2b and a plurality of transverse channels 2c passing through it from first face 2a to second face 2b.

Electrically insulating hard particles are designed to be arranged in certain transverse passages of said separator element so as to form spacers after assembly. The hard particles are for example chosen from ceramic, glass or polymer particles.

The solid electrolyte is formed by an ionically conducting material, i.e. anionically or cationically conducting, and it occupies the volume bounded by the channels of the separator element and by the passages of the current collectors in the fuel cell. The material forming the solid electrolyte is for example a perfluorinated polymer such as Nafion®.

FIGS. 5 to 9 illustrate the different steps of a particular embodiment of a fuel microcell according to the invention.

Figure 5:
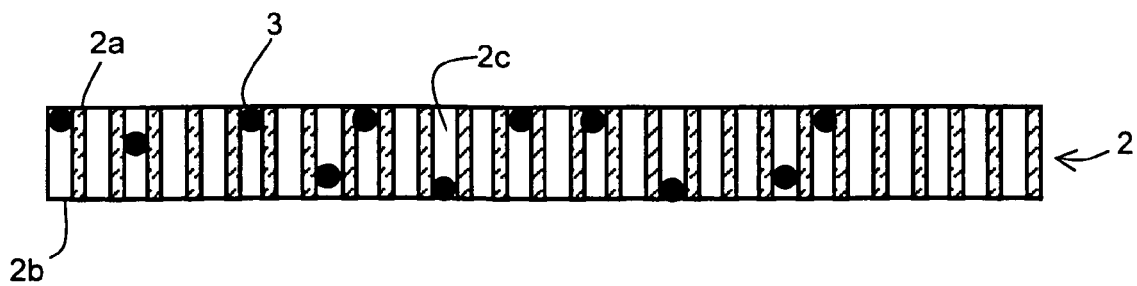
FIGS. 5 to 9 represent, in cross-section, different steps of a particular embodiment of a fuel cell according to the invention comprising two current collectors according to FIG. 1 and a separator element according to FIG. 4.
Figure 6:
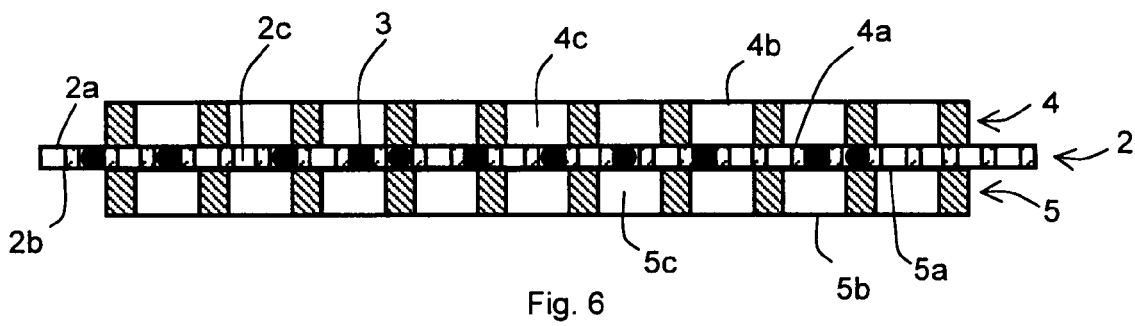

Thus, as represented schematically in FIG. 5, hard particles 3 are introduced into certain transverse channels 2c of separator element 2 represented in FIG. 4. Then, two current collectors 4 and 5, respectively in the form of a metallic grid made of gold or nickel, as represented in FIGS. 1 and 2, are assembled on separator element 2. Current collectors 4 and 5 are respectively cathodic and anodic and separator element 2 is for example in the form of a grid made of ETFE. Thus, each of current collectors 4 or 5 comprises a first surface 4a or 5a and a second surface 4b or 5b, with transverse passages 4c or 5c passing through the collector from first surface 4a or 5a to second surface 4b or 5b. In FIG. 6, first face 2a of separator element 2 is in contact with first surface 4a of cathodic current collector 4 whereas second face 2b of separator element 2 is in contact with first surface 5a of anodic current collector 5. Assembly of the two current collectors 4 and 5 on separator element 2 can be performed by pressing and more particularly by hot lamination of the two grids forming current collectors 4 and 5 on the grid forming separator element 2.

As represented in FIG. 6, separator element 2 is deformed during pressing, which enables incrustation and fixing of current collectors 4 and 5 in separator element 2. The presence of hard particles 3 in certain transverse channels 2c of separator element 2 prevents too great crushing of separator element 2. The thickness of separator element 2, after the assembly step, therefore preferably corresponds to the dimension of hard particles 3 and more particularly to their diameter if they are spherical.

Figure 7:
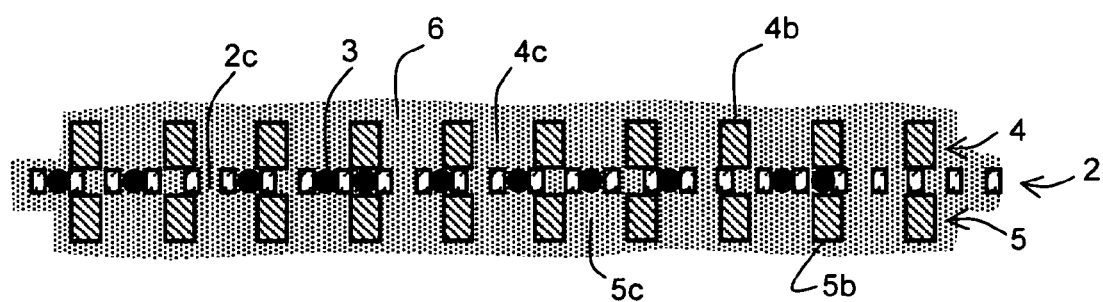

Then, as illustrated in FIG. 7, the assembly step is followed by a filling step of channels 2c and passages 4c and 5c by solid electrolyte 6. For a majority of transverse channels 2c to be filled with solid electrolyte 6, current collectors 4 and 5 are preferably formed and/or arranged in such a way as to leave an opening of each transverse channel 2c at least partially free. The width of transverse channels 2c of separator element is thus for example chosen much smaller than the respective widths of transverse passages 4c and 5c of current collectors 4 and 5. When current collectors 4 and 5 are of identical form, for example in the form of two identical metallic grids, assembly of the two current collectors 4 and 5 can be performed such that the transverse passages of one current collector are offset with respect to those of the other current collector.

The filling step can be performed by impregnating the structure represented in FIG. 7, i.e. the structure formed by separator element 2, hard particles 3 and two current collectors 4 and 5, with a precursor material of the solid electrolyte. The precursor material is preferably in the form of a liquid or pasty and preferably occupies the whole of the volume bounded by channels 2c of separator element 2 and passages 4c and 5c of current collectors 4 and 5. The precursor material is then cross-linked so as to obtain solid electrolyte 6.

The filling step can also be performed by immersing the structure represented in FIG. 7 in a solution containing at least one solvent and the electrolyte and by evaporation of said solvent. In this way, in the case of a proton conducting electrolyte, the structure represented in FIG. 7 can for example be immersed in a solution containing 20% of Nafion®. Drying by evaporation of the solvent or solvents then enables the electrolyte to be obtained in the form of a solid.

Figure 8:
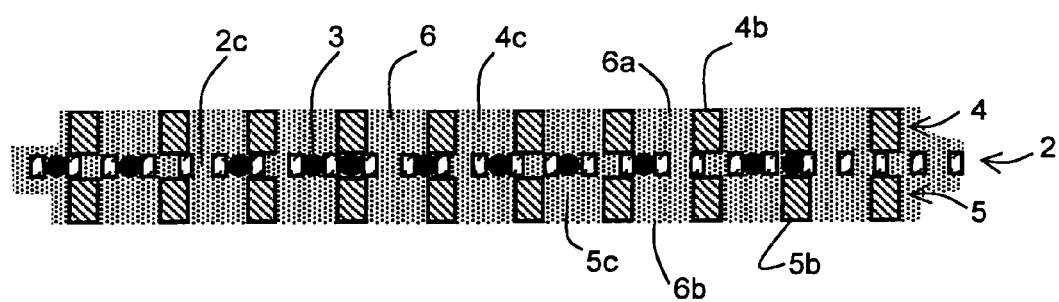

In this case and as represented in FIG. 7, solid electrolyte 6 envelops the whole of the structure. Thus, solid electrolyte 6 more particularly covers second surfaces 4b and 5b of current collectors 4 and 5. As represented in FIG. 8, a planarization step can then be performed to clear second surfaces 4b and 5b of current collectors 4 and 5. It is for example achieved by fixing the structure on a support and performing mechanical polishing of the two second surfaces 4b and 5b. This planarization step enables second surfaces 4b and 5b to be cleared and free surfaces 6a and 6b of solid electrolyte 6 respectively contained in transverse passages 4c and 5c to be placed at the same level as second surfaces 4b and 5b.

Figure 9:
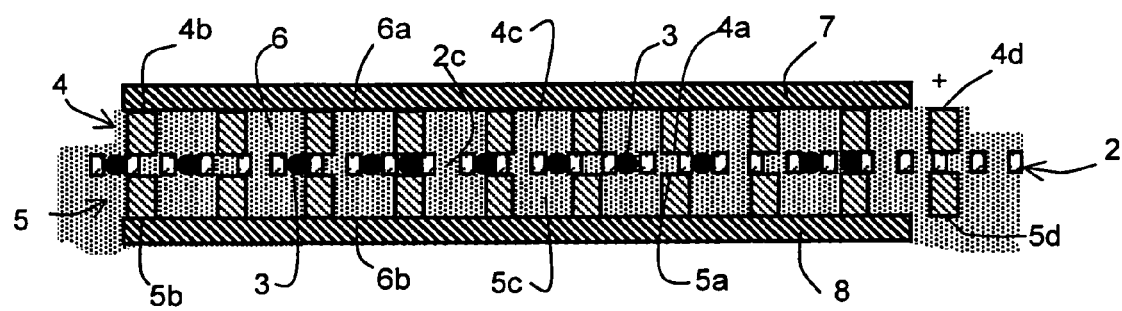

As represented in FIG. 9, preferably porous cathode 7 and anode 8 can be arranged respectively on second surface 4b of cathodic current collector 4 and on second surface 5b of anodic current collector 5. Each electrode 7 or 8 is then not only in contact with second surfaces 4b and 5b of current collectors 4 and 5 but also with surfaces 6a and 6b of solid electrolyte 6. Each electrode 7 or 8 is for example assembled on the second surface of the corresponding current collector by spraying a carbon ink charged with catalyst such as platinum. Furthermore, this assembly step can be performed in such a way that each current collector 4 or 5 comprises a lateral zone 4d or 5d, on its second surface 4b or 5b, that is not covered by corresponding electrode 7 or 8. Lateral zones 4*d* and 5*d* are then designed to act as electric connection or contact connection. The assembly can then be placed in a casing comprising a compartment for supply of the anode and a compartment for supply of the cathode.

The presence of the separator element in the fuel cell enables the current collectors to be electrically insulated while ensuring mechanical securing of the electrolyte. The thickness of the separator element is preferably comprised between 10 µm and 200 µm. This small thickness in particular enables the ohmic resistances to be reduced when the cell is operating thereby enabling the performances of the fuel cell to be improved. In addition, the fact that the solid electrolyte is arranged in the channels of the separator element and in the passages of the current collectors enables the current collectors to be integrated in the solid electrolyte and a self-supported electrolytic membrane to be obtained, i.e. a membrane that does not require any external support.

The fact that the separator element is made of thermoplastic polymer material makes said separator element flexible ensuring a good adhesion of the current collectors when the latter are assembled. Finally, the presence of spacers formed by the hard particles and arranged in transverse channels of the separator element enable crushing of the separator element made of thermoplastic polymer material to be limited when the current collectors are assembled on the separator element.

A fuel cell according to the invention presents the advantage of being simple and quick to produce. The presence of the separator element enables electric insulation of the current collectors to be mastered. Moreover, the fuel cell presents an architecture that is able to adapt to all types of size, and the contact zone between the electrodes and current collectors remains high.

The performances of the fuel cell are therefore high, it remains dependable and its overall dimensions can be reduced. The solid electrolyte does not in fact need to be supported by a bulky external support and it can be of very small thickness. Furthermore, the manufacturing process is very simple and quick to implement.

The invention claimed is:

1. A fuel cell comprising:
   an anodic current collector and a cathodic current collector, each current collector comprising at least one transverse passage passing through the current collector from a first surface to a second surface of the current collector;
   an electrically insulating separator element arranged between the anodic and cathodic current collectors, the separator element comprising:
      a first face and a second face opposite of the first face, the first and second faces being respectively in contact with the first surfaces of the anodic and cathodic current collectors, and
      a plurality of transverse channels passing through the separator element from the first face to the second face; and
   an ionically conducting solid electrolyte in contact with the anodic and cathodic current collectors, the solid electrolyte occupying a volume bounded by the transverse channels of the separator element and by the at least one passage of the current collectors,
   wherein:
   the separator element comprises a thermoplastic polymer material,
   the separator element presents, after pressing, a thickness determined by spacers formed by electrically insulating hard particles and arranged in the transverse channels of the separator element,
   the current collectors are made of metal, graphite, or an electrically conducting polymer material,
   the current collectors, after pressing, are incrusted and fixed into the electrically insulating separator element,
   materials of the separator element, the solid electrolyte, and the spacers are different from one another,
   a width of the transverse channels of the separator element is smaller than a width of the at least one passage of the current collectors, and
   the solid electrolyte is arranged in the transverse channels of the separator element and in the at least one passage of the current collectors.

2. The fuel cell according to claim 1, wherein the thermoplastic polymer material is formed by a fluorocarbon resin.

3. The fuel cell according to claim 2, wherein the fluorocarbon resin is selected from the group consisting of a modified ethylene and tetrafluoroethylene copolymer, a polyvinylidene fluoride, a polyvinylidene fluoride copolymer, and a propylene hexafluoride.

4. The fuel cell according to claim 1, wherein the hard particles are selected from the group consisting of ceramic, glass and polymer particles.

5. The fuel cell according to claim 1, wherein each current collector comprises a plurality of transverse passages.

6. The fuel cell according to claim 1, further comprising an anode arranged on the second surface of the anodic current collector and a cathode arranged on the second surface of the cathodic current collector, the anode and cathode being in contact with the solid electrolyte.

7. The fuel cell according to claim 6, wherein each current collector further comprises a non-covered lateral zone, on its second surface, designed to act as an electric connection.

8. The fuel cell according to claim 1, wherein at least one current collector is in a form of a grid, a comb, or a thin layer of a woven material or of a porous material.

9. The fuel cell according to claim 1, wherein the separator element is in a form of a perforated film, a grid, or a thin layer of a woven material or of a porous material.

10. A process for manufacturing the fuel cell according to claim 1, successively comprising:
   providing:
      the anodic current collector and the cathodic current collector, and
      an electrically insulating separator element;
   inserting the spacers comprising the electrically insulating hard particles in the transverse channels of the separator element;
   assembling the anodic and cathodic current collectors by pressing, with their first surfaces respectively on the first and second faces of the separator element and a deformation of the separator element during pressing so as to incrust and fix the current collectors in the separator element, the separator element presenting, after pressing, a thickness determined by spacers formed by electrically insulating hard particles, and
   filling the transverse channels and the at least one passage of each current collector with the ionically conducting solid electrolyte, the ionically conducting solid electrolyte being in contact with the two current collectors and occupying the volume bounded by the transverse channels of the separator element and by the at least one passage of the current collectors.

11. The process according to claim 10, wherein the assembling of the current collectors on the first and second faces of the separator element is performed by hot lamination.

12. The process according to claim 10 wherein the filling of the transverse channels and the at least one passage with the solid electrolyte is performed by impregnating the separator element, equipped with the anodic and cathodic current collectors, with a precursor material of the solid electrolyte, and then cross-linking the precursor material to obtain the solid electrolyte.

13. The process according to claim 10, wherein the filling of the transverse channels and the at least one passage with the solid electrolyte is performed by immersing the separator element, equipped with the anodic and cathodic current collectors, in a solution containing at least one of a solvent and the electrolyte, and then evaporating the solvent.

14. The process according to claim 10, wherein the filling of the transverse channels and the at least one passage comprises a planarization step to clear the second surfaces of the anodic and cathodic current collectors.

15. The process according to claim 10, wherein the filling of the transverse channels and the at least one passage is followed by assembly of an anode on the second surface of the anodic current collector and a cathode on the second surface of the cathodic current collector.

* * * * *